Sept. 3, 1929.   C. H. JORDING   1,726,837
HEAD LAMP FOR MOTOR VEHICLES
Filed April 28, 1928
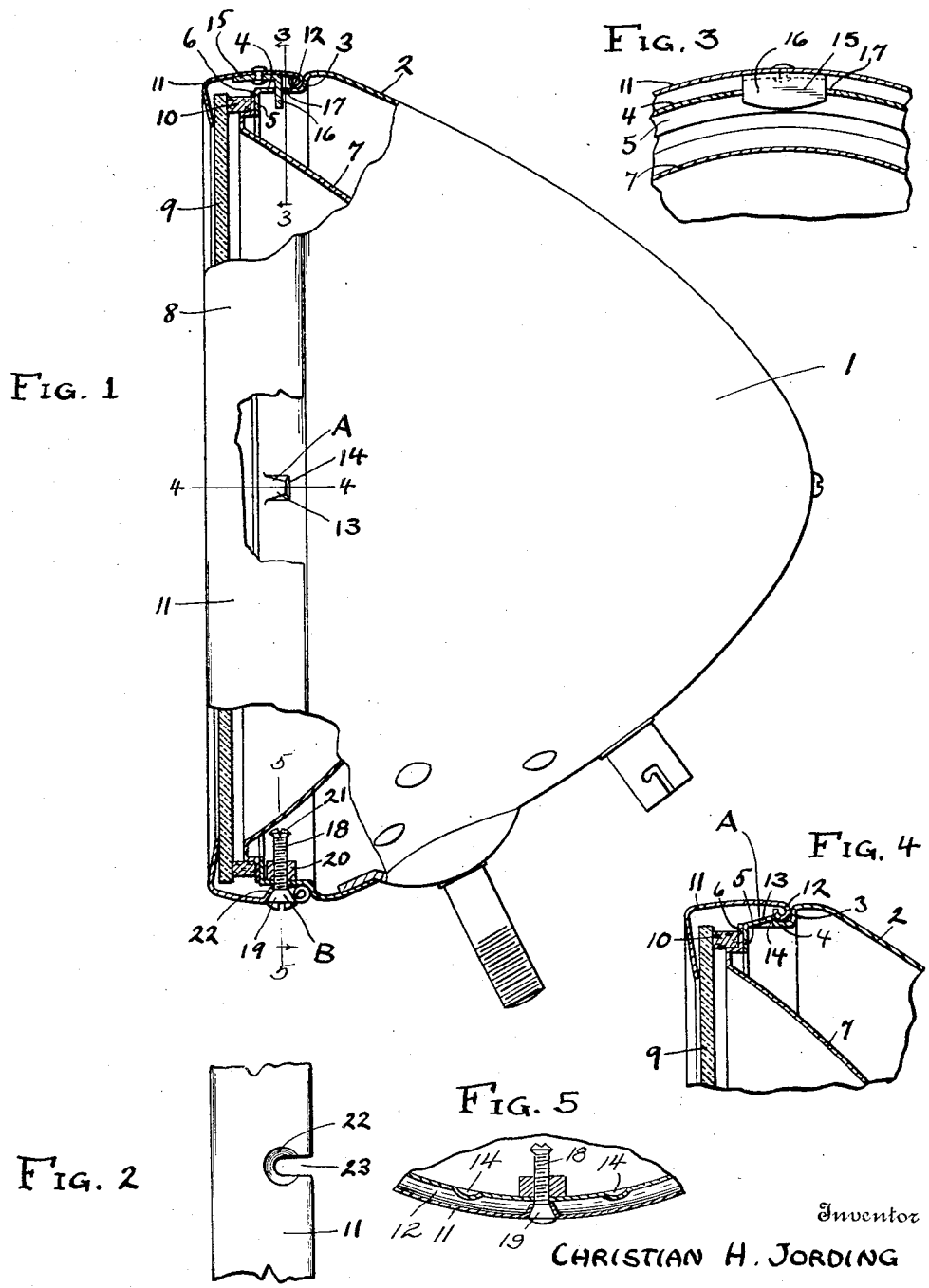
Inventor
CHRISTIAN H. JORDING
By W. S. McDowell
Attorney Patented Sept. 3, 1929.

1,726,837

UNITED STATES PATENT OFFICE.

CHRISTIAN H. JORDING, OF COLUMBUS, OHIO, ASSIGNOR TO THE JOHN W. BROWN MANUFACTURING COMPANY, OF COLUMBUS, OHIO, A CORPORATION OF OHIO.

HEADLAMP FOR MOTOR VEHICLES.

Application filed April 28, 1928. Serial No. 273,722.

This invention relates to lamps of the type employed particularly in connection with motor vehicles, although in certain other aspects of the invention, the latter is directed to lamps adapted for any particular use, whether for motor vehicles or for other purposes.

More particularly the invention is directed to the provision of an improved lamp construction wherein novel securing means are provided for separably uniting the closure ring to the body of the lamp, and an outstanding object of the invention resides in the provision of simple and improved means for effecting this result and one wherein the closure ring is securely drawn into seated engagement with the ring seat, provided upon the outer edge of the lamp body for the purpose of securing a neat and attractive appearance and at the same time to tightly seal the interior of the lamp against the ingress of dirt, moisture and other foreign matter.

It is another object of the invention to provide a simple construction which may be readily operated to permit of the removal or fastening of the closure from and upon the lamp body.

A still farther object of the invention resides in providing the body of the lamp, contiguous to the ring seating flange with a pair of resilient enlargements which cooperate with the edges of the closure ring so as to provide a primary lock for holding the closure in seated engagement with the body flange.

It is a still further object of the invention to provide an additional and final securing means in the form of a screw having a conical head and which when finally tightened will serve to draw the closure structure as a whole into firm seated engagement with the body flange whereby through the provision of the initial and final locking mechanism a very positive construction is provided for retaining the lens closure in secured and operative relationship with respect to the lamp body.

With these and other objects in view, as will appear as the description proceeds, the invention consists in the novel features of construction, combinations of elements and arrangements of parts hereinafter to be more fully described and pointed out in the appended claim.

In the accompanying drawing:

Figure 1 is a view in side elevation of a vehicle head lamp, parts of the lamp being broken away and disclosed in section for the purpose of illustrating interior structure, Figure 2 is a fragmentary view in edge elevation of the lens ring or closure and disclosing more particularly the slot for the reception of the locking screw, Figure 3 is a detail vertical sectional view taken on the plane indicated by the line 3—3 of Figure 1, Figure 4 is a horizontal sectional view on the plane indicated by the line 4—4 of Figure 1, and Figure 5 is a detailed vertical sectional view taken on the plane indicated by the line 5—5 of Figure 1.

Referring more particularly to the drawings the numeral 1 designates a vehicle head lamp in its entirety. The head lamp is formed to comprise a sheet metal body 2 of any desired formation or contour. The perimeter of the body 2 at the forward end of the lamp is formed to include an annular inwardly directed shoulder 3 which, in turn, terminates in a forwardly directed flange 4, the shoulders 3 and the flange 4 serving to form what may be termed a closure seat. The flange 4 terminates in an inwardly directed circular rib 5, disposed in a vertical plane and upon which is positioned the out-turned flange 6 formed upon the perimeter of a reflector 7, the latter being arranged, as usual, within the body 2.

Cooperative with this structure is a closure 8. This closure consists of a glass lens 9, the edges of which rest upon a gasket 10 which is seated in connection with the flange 6 of the reflector 7. The lens 9 is carried in any suitable manner by a lens or closure ring 11, and this ring is adapted to be seated on the body flange 4, the inner edge of the ring 11 being curled as at 12 to engage with the shoulder 3.

It is desirable that a tight or close fitting joint shall exist between the inner edge 12 of the ring 11 and the seat or shoulder 3, in order that the symmetry as outlined of the head lamp will be preserved and at the same time to prevent the ingress of foreign matter. To accomplish this there is provided an initial locking mechanism, indicated by the letter A and a final locking mechanism which is indicated by the letter B.

The initial locking mechanism consists of a pair of resilient heads or enlargements 13 which are struck or punched outwardly from the flange 4 of the body 2 so as to produce locking shoulders 14, which cooperate with the curled edges 12 of the lens ring 11. It will be seen that in order to initially position and fasten the closure of the body, the closure is moved inwardly in a straight axial direction with respect to the lamp body. This forces the ring 11 to spring outwardly or the projections 13 to move inwardly a sufficient distance so that the curled edges 12 of the lens ring may pass over said enlargements 13 and seat between the shoulders 14 and the annular shoulder 3, the resiliency of the enlargement serving to fasten or hold the closure in its seated position on the lamp body.

The inward locking movement of the lens ring is, in reality, a swinging motion in an axial direction of the lamp body rather than a straight linear movement. This is accomplished by providing the ring 11 at the upper portion of the lamp with an angular bracket 15, the vertical leg 16 of which extends through a slot 17 formed in the flange 4. The bracket 15 thus acts as a fulcrum permitting of the swinging movement of the lens closure while the initial locking mechanism A is being operated. Following the operation of the initial locking mechanism the final fastening of the lens ring or closure is secured by the locking mechanism B.

This locking mechanism consists of a vertically arranged screw 18 arranged in the bottom part of the lamp. The screw is provided with a conical head 19, which has its outer wall formed with a tool receiving slot. The threaded shank of the screw is received within a stationary nut 20 or other threaded body arranged within and upon the flange 4, and the extreme inner end of the shank of the screw is slightly spread as at 21 so as to prevent accidental loss or complete disengagement of the screw from the lamp body. In reference to Figure 2 it will be observed that the ring 11 is provided with a conical depression 22 corresponding somewhat in formation to the head 19 of the screw 18. This conical depression communicates with a restricted entrance portion 23 which conforms to the diameter of the shank of the screw 18.

In operation, the first step in fastening the closure in place is to insert the leg 16 of the bracket 15 into the slot 17 provided in the upper portion of the flange 4. Then by manually swinging the closure in an inward direction the resilient enlargements 13 and particularly the shoulders 14 thereof engage with the curled edges 12 of the lens ring with sufficient security so that the initial locking mechanism will retain the closure in its applied position on the lamp. This brings the pocket or depression 22 into registration with the screw 18, permitting the shank of the screw to be located in the restricted portion 23. Then by tightening said screw the lens ring is moved rearwardly so that the curled edge 12 tightly engages with the shoulder 3, and this movement is continued until the conical head of the screw is seated in the depression 22. Normally the depression 22 does not align with the head 19, and therefore when the head 19 is finally positioned within the depression 22 the lens ring will be fully moved over into fully sealed engagement with the shoulder 3. It will be observed that the screw 18 is arranged on the under side of the lamp so that the head will not be observable from ordinary exterior inspection. In the event the screw should become loosened from some cause the initial locking mechanism will function to prevent complete disengagement of the lens closure. To remove the closure the screw 18 is loosened so that the shank thereof is brought into registration with the restricted slot 23. Then by placing the point of the screw driver or other tool in the joint provided between the bead 12 and the shoulder 3, the complete release of the lens closure may be readily effected.

What is claimed is:

In a headlamp, a lamp body provided at its outer end with a shouldered flange, a closure for the open end of said body comprising a lens and a ring surrounding the edge of said lens, said ring having a curled inner edge and adapted to be seated upon said flange, a separable and pivoted connection between said ring and said flange, a screw carried by said flange opposite to said pivoted connection, a pair of enlargements formed with said flange and spaced approximately equi-distant from said screw and said pivoted connection, said enlargements being adapted to cooperate with the curled edge of said ring to retain the latter in its seated position upon said body, a threaded journal carried by said flange for the reception of the shank of said screw, and a conical head formed upon the outer end of said screw, said head being receivable within a conical depression formed within said ring whereby when said screw occupies a tightened position said ring is positively retained in seating engagement with said flange.

In testimony whereof I affix my signature.

CHRISTIAN H. JORDING.